(12) United States Patent
Marchesini (10) Patent No.: US 11,433,343 B2
(45) Date of Patent: Sep. 6, 2022

(54) DUST COLLECTOR FOR GASEOUS FLUIDS AND A METHOD FOR MANUFACTURING THE DUST COLLECTOR

(71) Applicant: WAMGROUP S.P.A., Modena (IT)

(72) Inventor: Vainer Marchesini, San Prospero (IT)

(73) Assignee: WAMGROUP S.P.A., Modena (IT)

(*) Notice: Subject to any disclaimer, the term of this patent is extended or adjusted under 35 U.S.C. 154(b) by 196 days.

(21) Appl. No.: 16/471,481

(22) PCT Filed: Dec. 22, 2017

(86) PCT No.: PCT/IB2017/058346
§ 371 (c)(1),
(2) Date: Jun. 19, 2019

(87) PCT Pub. No.: WO2018/116268
PCT Pub. Date: Jun. 28, 2018

(65) Prior Publication Data
US 2020/0086260 A1   Mar. 19, 2020

(30) Foreign Application Priority Data
Dec. 22, 2016  (IT) ................ 102016000130256

(51) Int. Cl.
*B01D 39/14* (2006.01)
*B01D 46/00* (2022.01)
(Continued)

(52) U.S. Cl.
CPC ......... *B01D 46/2403* (2013.01); *B01D 39/14* (2013.01); *B01D 39/18* (2013.01);
(Continued)

(58) Field of Classification Search
CPC ........ B01D 39/14; B01D 39/18; B01D 46/04; B01D 46/0068; B01D 46/4272;
(Continued)

(56) References Cited

U.S. PATENT DOCUMENTS 3,813,853 A * 6/1974 Anderson .......... B01D 46/0068
95/279
4,451,370 A * 5/1984 Murai .................. B01D 63/082
210/321.77
(Continued)

FOREIGN PATENT DOCUMENTS

AU        630610 B2      11/1992
AU      2010210024       9/2010
(Continued)

*Primary Examiner* — Minh Chau T Pham
(74) *Attorney, Agent, or Firm* — Pearne & Gordon LLP (57) ABSTRACT

The invention relates to a dust collector for gaseous fluids and to a method for manufacturing the dust collector. The dust collector includes one or more filtering assemblies (1) that have filtering elements (2). The filtering elements (2) have a tubular extension. They are kept in contact with each other along a direction parallel to their length; the filtering elements (2) enclose, between them, flow channels (3).
The method for manufacturing a filtering assembly (1) of the dust collector includes the steps of: permanently deforming a sheet of a filtering material so as to obtain a corrugated sheet (8) with a cross-section defined by repetitions of 'Ω-shaped forms that are connected to each other; and coupling two deformed sheets, so as to keep the straight parts of the 'Ω-shaped forms in contact and to obtain rows of filtering elements (2).

15 Claims, 4 Drawing Sheets

(51) Int. Cl.
  *B01D 46/24* (2006.01)
  *B01D 46/58* (2022.01)
  *B01D 39/18* (2006.01)

(52) U.S. Cl.
  CPC ..... *B01D 46/0001* (2013.01); *B01D 46/0005* (2013.01); *B01D 46/58* (2022.01); *B01D 2239/0618* (2013.01); *B01D 2265/06* (2013.01); *B01D 2267/30* (2013.01); *B01D 2267/60* (2013.01)

(58) Field of Classification Search
  CPC ............ B01D 46/2403; B01D 46/0001; B01D 46/002; B01D 46/0005; B01D 46/2418; B01D 46/2422; B01D 46/00; B01D 46/24; B01D 2239/0618; B01D 2265/06; B01D 2267/30; B01D 2267/60; B01D 2046/2488
  USPC ........... 55/283, 294, 302, 341.3, 341.1, 431; 95/279, 286; 96/397
  See application file for complete search history.

(56) References Cited

U.S. PATENT DOCUMENTS

| | | | |
|---|---|---|---|
| 4,756,835 A * | 7/1988 | Wilson | B01D 53/22 210/321.83 |
| 5,002,666 A | 3/1991 | Matsumoto et al. | |
| 5,049,326 A | 9/1991 | Matsumoto et al. | |
| 5,348,568 A | 9/1994 | Oda et al. | |
| 5,558,689 A | 9/1996 | Yanagihara et al. | |
| 6,010,560 A * | 1/2000 | Witzko | B29C 53/385 96/8 |
| 6,290,743 B1 | 9/2001 | Alvin et al. | |
| 8,277,526 B2 * | 10/2012 | Cho | B01D 46/2403 55/296 |
| 8,691,001 B2 * | 4/2014 | Boatwright, Jr. | B01D 46/4281 96/421 |
| 9,084,957 B2 | 7/2015 | Rocklitz | |
| 9,492,792 B2 | 11/2016 | Tomescu et al. | |
| 9,855,519 B2 | 1/2018 | Rocklitz | |
| 10,343,103 B2 | 7/2019 | Ouyang et al. | |
| 10,478,777 B2 | 11/2019 | Tomescu et al. | |
| 10,946,313 B2 | 3/2021 | Rocklitz | |
| 10,953,360 B2 | 3/2021 | Ouyang et al. | |
| 2003/0200733 A1 * | 10/2003 | Jung | B01D 46/002 55/302 |
| 2004/0226274 A1 * | 11/2004 | Colamussi | F01N 3/0222 55/482 |
| 2005/0039601 A1 * | 2/2005 | Kosmider | B01D 46/0013 95/273 |
| 2005/0115891 A1 * | 6/2005 | Vellinga | C02F 3/1268 210/601 |
| 2006/0070364 A1 | 4/2006 | Reamsnyder et al. | |
| 2007/0289265 A1 | 12/2007 | Coulonvaux et al. | |
| 2008/0282657 A1 | 11/2008 | Reamsnyder et al. | |
| 2009/0223187 A1 * | 9/2009 | Nelson | B01D 46/0005 55/357 |
| 2010/0078379 A1 | 4/2010 | Rocklitz | |
| 2013/0092621 A1 | 4/2013 | Tomescu et al. | |
| 2014/0047806 A1 | 2/2014 | Heidenreich | |
| 2014/0150386 A1 * | 6/2014 | Addiego | C04B 38/0006 55/484 |
| 2015/0040763 A1 * | 2/2015 | O'Brien | F01N 3/2828 95/273 |
| 2015/0375142 A1 | 12/2015 | Rocklitz | |
| 2017/0028353 A1 | 2/2017 | Tomescu et al. | |
| 2017/0216575 A1 | 8/2017 | Asleson et al. | |
| 2018/0214797 A1 | 8/2018 | Rocklitz | |
| 2019/0388822 A1 | 12/2019 | Ouyang et al. | |
| 2020/0038810 A1 | 2/2020 | Tomescu et al. | |
| 2021/0170320 A1 | 6/2021 | Ouyang et al. | |
| 2021/0268408 A1 | 9/2021 | Rocklitz | |

FOREIGN PATENT DOCUMENTS

| | | |
|---|---|---|
| CN | 103585836 A | 2/2014 |
| DE | 3802190 | 8/1989 |
| EP | 0350338 | 1/1990 |
| EP | 0554886 | 8/1993 |
| GB | 936361 | 9/1963 |
| JP | 05057122 | 3/1993 |
| JP | H07-259891 A | 10/1995 |
| KR | 100323298 B1 | 6/2002 |
| RU | 2076770 C1 | 4/1997 |
| RU | 2283687 C1 | 9/2006 |
| SU | 472199 A1 | 5/1975 |
| WO | 0145822 | 6/2001 |
| WO | 2010011910 A2 | 1/2010 |
| WO | 2011130853 A1 | 10/2011 |
| WO | 2016019307 A1 | 2/2016 |

* cited by examiner

DUST COLLECTOR FOR GASEOUS FLUIDS AND A METHOD FOR MANUFACTURING THE DUST COLLECTOR

BACKGROUND OF THE INVENTION

Field of the Invention

The present invention relates to a dust collector for gaseous fluids and a method for manufacturing the dust collector.

Reference is specifically made to industrial machines (dust collectors) that process gaseous fluids, normally air contaminated by industrial transformation processes, with presence of dust in the air in a decisively significant percentage, this percentage being much higher than the normal presence of dust in environmental air. The use function of these machines is that of treating polluted industrial air in order to make it compatible for discharge into the atmosphere and/or into enclosed work environments. Specifically, but not exclusively, the present invention relates to a dust collector that can be used for removing dust from gaseous fluids, the gaseous fluids being composed of air containing dust that is generated when loading silos or during processes of transformation, movement, cutting or other industrial processes, performed, for example, through mixers, conveyors, packaging machines, dosers, thermal or mechanical cutting machines and/or the like; these gaseous fluids cannot be discharged into the atmosphere or reused without prior removal of the dust that they contain.

Description of Related Art

The dust collectors in question, which have a total volume that may even be of some cubic metres, are normally realized with one or more filtering assemblies in each of which there are numerous filtering elements.

The filtering elements have various shapes and sizes; normally these elements have a tubular extension and a length in the order of 50 centimetres or more.

In their industrial applications, these dust collectors treat air that contains fine dust, i.e. dust having a particle size ranging from about 0.5 micron to 1000 micron, which have concentrations that range from about 0.5 gr/m$^3$ to 500 gr/m$^3$.

More in detail, in the field of particulate contaminants, air cleaning devices are divided into two basic groups: air filters and dust collectors. Air filters are designed to remove low dust concentrations of the magnitude found in atmospheric air. They are typically used in ventilation, air-conditioning, and heating systems where dust concentrations seldom exceed 1.0 grains per thousand cubic feet of air, and are usually well below 0.1 grains per thousand cubic feet of air.

Dust collectors are usually designed for industrial processes where the air or gas to be cleaned has contaminant concentrations which vary from less than 0.1 to 100 grains or more for each cubic foot of air or gas.

Therefore, dust collectors are capable of handling concentrations 100 to 20000 times greater than those for which air filters are designed.

Due to the high quantity of dust in the air to be filtered, the filtering elements of the dust collector tend to get clogged very quickly; therefore, these dust collectors must be combined with periodic cleaning systems of an automatic or semi-automatic kind (intervention of the cleaning system at the operator's discretion and not managed by software).

From the original cylindrical fabric sleeve to the current oval shapes made of pleated paper, the state of the art has seen a continuous evolution of embodiments designed to increase the filtering surface exposed to the stream of polluted air, by unit of volume of the dust collector itself, with dimension and cost advantages.

Dust collectors are currently known that have a plurality of tubular filtering elements, with circular, oval or polygonal cross-sections, that have an open end and a closed end so as to have one side from which only dirty air enters and one side from which only clean filtered air exits. The external casing of these filtering elements, which is the filtering surface, can be made of fabric or cellulose of various types and can be smooth or have pleats; the pleats increase the nominal filtering surface area but they often define, in their cusps, sectors where dust can lurk. This makes the active filtering surface area smaller, sometimes significantly, than the nominal filtering surface area. In fact, the sharp edges of the pleated elements are the starting point for adhesion of dust and formation of significant agglomerates that obstruct the passage of air.

In addition to reducing the filtering surface area available for the air, the dust held in the pleats is particularly dangerous in food applications where the build-up of dust is highly negative due to the risk of proliferation of the bacterial load; the pleats are also not very functional for all dust that tends to get packed. In any case, none of these dust collectors is suitable for filtering wet dust, let alone liquids.

Depending on the operating mode of the dust collector, the gaseous fluid with the dust to be eliminated can enter the open end of the filtering element, or the gaseous fluid free from dust can exit from the open end of the filtering element; in the former case the dust is deposited on the internal surface of the filtering element while in the latter case it is deposited on its external surface.

In dust collectors of the prior art, the filtering surface is normally combined with a reinforcement structure, inside or outside the filtering element, which has the purpose of preventing, during operation of the dust collector, any deformation of the filtering element which would reduce the filtering surface area exposed to the stream of fluid from which dust has to be removed.

The construction of these dust collectors must face problems that are typical and specific thereof which, as mentioned, have considerable dimensions and must filter large quantities of gaseous fluids. For example, it is desirable to increase the ratio between the active filtering surface and the volume of the filter, i.e. it is desirable to increase the filtering efficiency if compared with other filters of the same type having the same dimensions; furthermore, the energy consumption for operation and cleaning of these dust collectors also needs to be reduced, as much as possible.

Another problem to be faced is that of simplifying the construction of dust collectors with respect to the construction methods found in the dust collectors of the prior art.

Some known filters are disclosed in patent documents EP 0350338, DE3802190, US 2006/0070364. These documents relate to filters intended to be used in the automotive field, that are designed to be replaced when the corresponding filtering material gets dirty beyond an acceptable limit, or possibly to be manually cleaned after the filtering material has been disassembled from respective supports.

The filters disclosed in EP 0350338, DE3802190, US 2006/0070364 are not suitable for being used in industrial machines that process gaseous fluids, in which the filtering material gets dirty much more quickly than in the automotive field.

BRIEF SUMMARY OF THE INVENTION

The object of the present invention is to provide a dust collector that solves the aforementioned problems of the prior art in a better way than known dust collectors of the same type.

An advantage of the invention is that of providing a dust collector that has reduced dimensions in relation to its active filtering surface area.

Another advantage of the present invention is that of allowing effective cleaning through a cleaning system with reduced dimensions and operating with low energy waste.

Still another advantage of the present invention is that of having a structure of notable solidity and strength, that can be installed in any position with respect to the environment to be purified, thereby leading to various advantages: lighter, more contained dimensions, better integration with process machines or industrial systems.

Still another advantage of the present invention is that of providing a method that is simple and quick for manufacturing the dust collector in question.

These objects and advantages and others are reached by the present invention as characterised by the following claims.

BRIEF DESCRIPTION OF THE SEVERAL VIEWS OF THE DRAWINGS

Further features and advantages of the present invention will become clear from the following detailed description of the steps of the method in question and of an embodiment of the dust collector in question, illustrated purely by way of non-limiting example in the attached drawings, in which.

DETAILED DESCRIPTION OF THE INVENTION

The dust collector in question is used for removing dust from gaseous fluids containing fine dust; in particular the dust collector is used for removing dust from air containing fine dust that has a particle size ranging from about 0.5 micron to 1000 micron. These dust collectors are capable of removing dust from fluids, in particular air, that are contaminated by industrial transformation processes, with presence of dust in concentrations ranging from about 10 mg/m$^3$ to 2000 mg/m$^3$; because of the presence of high quantities of dust, these dust collectors are always combined with a periodic automatic or semi-automatic cleaning system.

In the dust collector in question, there are one or more filtering assemblies 1 each of which has numerous filtering elements 2 that have a tubular extension and are closed at one end. The filtering elements are made with a semi-rigid filtering material, of the known type, such as a non-woven fabric or cellulose.

In the following description, reference will be made to a system of cartesian axes X, Y, Z, where axis Z identifies the longitudinal direction of the filtering elements (i.e. their length), while axes X and Y define a plane perpendicular to that direction, i.e. a plane that contains the cross-sections of the filtering assembly.

In the dust collector in question all the filtering elements 2 of the same filtering assembly are kept in close contact with each other along a direction parallel to their length so as to enclose, between them, flow channels 3 for the gaseous fluid, the flow channels 3 being laterally closed by the external walls of the filtering elements; the cross-sections of the filtering elements 2 and of the flow channels 3 define, as a whole, a cross-section, of the filtering assembly 1 of which they are a part, as a two-dimensional repetition of closed geometric figures. For the operation of the dust collector, as will be better described below, the flow channels 3 are closed at the end opposite the end at which the filtering elements are closed.

Each filtering assembly 1 comprises at least one elementary filtration cell which in turn comprises four filtering elements 2, kept in contact with each other, between the lateral walls of which a flow channel 3 is defined; the assembly of elementary filtration cells, vertically connected to one another, defines the overall volume of the filtering assembly that can have various shapes and sizes.

It is very effective to provide for a connection of at least some of the filtering elements 2 through the interposition of spacer sections 4; these spacer sections 4 extend along the whole length of the filtering elements that they connect, and have a width such as to cause an increase in the cross-sectional area of a flow channel 3 so as to optimize the flows of gaseous fluid from a dirty zone to a purified zone, while allowing lower passage resistance. The lower passage resistance and the lower residual pressure present in the dirty area implies easier removal of the dust from the filtering surface and a consequent improvement in cleaning.

In the dust collector in question, the filtering elements 2 have a curvilinear cross-section which is preferably circular but may be slot-shaped or elliptical; some filtering elements are firmly connected to each other by means of the aforementioned spacer sections 4, which are arranged on the generatrices of the filtering elements; hence, rows of filtering elements are formed, spaced apart from each other and which extend along the X axis. These rows of filtering elements spaced apart from each other, which extend along the X axis, are arranged side by side in the direction of the Y axis and are kept in contact with each other so that each filtering element is in contact, along a generatrix thereof, with the generatrix of a filtering element in the adjacent row. This conformation allows the filtering assembly to operate very effectively; in particular the operation is effective when the fluid containing dust enters into the filtering elements through their open end and exits through the filtering surface, after the dust has been withheld on the internal surface of the filtering elements, to flow into the various flow channels through which the fluid without dust is discharged into the atmosphere. In fact, with this configuration the contact surfaces between the various filtering elements are optimized, both from the operational point of view and from the construction point of view; these contact surfaces extend along the Z axis and are limited to four generatrices per filtering element. The contact surfaces between the various elements have a double thickness that does not allow effective filtration and causes a reduction of the useful filtration surface. In the dust collector in question these "double surfaces" are, as mentioned, reduced to a minimum since their width is designed to only have close contact between the various filtering elements.

The curvilinear section of the filtering elements further avoids zones, which are instead present in pleated filtering elements, in which dust can build up.

The filtering elements belonging to the various rows that extend along the X axis are structurally kept in contact through the spacer sections 4 that connect the various elements. The filtering elements of the various rows are kept in contact with the filtering elements of the adjacent rows either through gluing or welding along the contact generatrices or, as will be better described below, through a mechanical constraint that keeps the filtering elements of the various rows compressed against each other.

For the filtering assembly, a parallelepiped shape with a polygonal base, in particular a rectangular or square base as shown in the figures, is particularly effective and of easy construction. The diameters of the cross-sections of the filtering elements are preferably comprised between 5 and 30 millimetres while the interaxis existing between the various filtering elements ranges from once the diameter, for the filtering elements connected along the Y axis, to twice the diameter for the filtering elements connected to each other along the X axis through the spacer sections 4; the length of these last interaxes clearly depends on the length of the various spacer sections 4 which will be from zero to once the diameter of the filtering elements. The ratio between the length of the filtering element and its diameter is comprised between 15 and 100; it is particularly favourable to have a ratio between the length of the filtering element and its diameter comprised between 30 and 50. However, it has been verified that it is appropriate for the length of the filtering elements not to exceed 1200-1500 millimetres.

The maximum dimensions of the overall section of the filtering assembly depend on the extension of the filtering surface to be obtained, in relation to the dimensions of the diameters and lengths of the pre-chosen filtering elements. Obviously the dimensions of the filtering assemblies must be compatible with the spaces available for their placement; in any case the configuration of the filtering assembly described above provides an excellent ratio between the volume occupied by the assembly and the extension of the useful filtering surface obtained.

Regardless of the presence of other components of the filtering assembly that will be described below and that perform particular functions, the structure of the filtering assembly in question guarantees excellent rigidity performance without any type of support or frame having to be inserted. The filtering element is not only self-supporting, but able to fulfil structural tasks in turn. Its response to the dynamic cleaning stress is excellent. This structure is intrinsically rigid to bending, both on the transversal and the longitudinal plane, and to compression in the vertical direction.

Each filtering assembly 1 comprises a head and a closure bottom that perform the function of closing the ends of the filtering elements and the flow channels. In particular, there is a head 5 that is arranged at one end of the filtering assembly and comprises closure caps 5a, for the closed ends of the filtering elements 2, and openings 5b for the open ends of the flow channels 3; there is also a closure bottom 6 that is arranged at the other end of the filtering assembly and that comprises closure caps 6a, for the closed ends of the flow channels 3, and openings 6b for the open ends of the filtering elements 2. The head 5 and the closure bottom 6 are made of an elastomeric or plastic polymer material.

The presence of the head 5 and of the closure bottom 6 makes unnecessary any gluing or welding between the elements of the various rows; the closure caps 5a and 6a, whose reciprocal positions are fixed and predetermined in relation to the dimensions of the sections of the filtering elements and of the flow channels, prevent movements of the rows of filtering elements, in particular in the Y direction; the various rows of filtering elements therefore always remain in close contact with each other along the generatrices of the various mutually facing filtering elements.

It is however possible to use caps separated from each other to close the ends of the filtering elements and the flow channels; in this case, as well as having greater complexity in the construction of the assembly, the rows of filtering elements must also be glued or welded.

On the head and on the closure bottom, conveyors are provided for conveying the gaseous fluid, for example, hoods not illustrated in the figures, that have the function of conveying the gaseous fluid containing the dust into the filtering assembly and conveying the gaseous fluid free of dust towards the outside, respectively; the conveyor that conveys the gaseous fluid containing the dust also has, in the dust collector cleaning steps, the function of collecting the dust that is detached from the filtering surfaces. In dust collectors that comprise a plurality of filtering assemblies, the conveyors also perform the function of splitters for conveying the fluids into the various assemblies.

In each filtering assembly 1 an external casing 7 is further provided, which extends between the head and the closure bottom and encloses all the filtering elements of the assembly. The external casing 7 defines further flow channels 3a for the gaseous fluid between its internal surface and the external surface of the filtering elements that are at the periphery of the filtering assembly. In this way also the external surface of the filtering elements exposed outside the filtering assembly is isolated from the dusty zone, where there is polluted air, so that also the external filtering surface can be used for dust collection, thereby creating a corresponding flow channel for the clean air. With this casing the useful surface area density per unit of volume is further increased. This external casing further contributes to increasing the rigidity to compression of the assembly since, as well as having its own rigidity, it keeps the various filtering elements compressed between each another.

Since the filtering assembly 1 is immersed in a dusty environment, the closure bottom 6 is conformed so as not to create zones of dust accumulation, that cannot be cleaned by automatic or semi-automatic cleaning systems. Therefore the closure bottom 6 will follow the external profile of the casing 7.

The dust collector further comprises a clearing system for cleaning the filtering assembly 1. In particular, the cleaning system is configured to clean the components of the filtering assembly 1 on which dust is deposited. Hence, the cleaning system is configured to clean the filtering elements 2, if the fluid to be cleaned enters into the filtering elements 2 through their open ends and the cleaned fluid exits from the flow channels 3 after the dust has been withhold on the inner surface of the filtering elements 2.

In an alternative working configuration, in which the fluid to be cleaned enters into the flow channels 3 and the cleaned fluid exits from the filtering elements 2, the cleaning system is instead configured to clean the flow channels 3, on the inner surfaces of which (i.e. on the outer surface of the filtering elements 2), the dust has been deposited.

The cleaning system can be of a pneumatic type.

In particular, the cleaning system can comprise a blowing device for dispensing one or more jets of pressurized air on a filtering surface of the filtering elements 2 that withholds the dust. These air jets act on the filtering surface in countercurrent with respect to the fluid to be treated. This kind of cleaning system can be combined with dynamic devices, i.e. vibrating devices, which help the dust in detaching from the filtering surface.

As an alternative, the blowing device can comprise a plurality of dispensing elements, each of which is conformed as a pipe suitable for being inserted into a component to be cleaned (i.e. inside a filtering element 2 or alternatively inside a flow channel 3) in order to dispense a low-pressure air jet directly on the component to be cleaned, in countercurrent with respect to the fluid to be cleaned.

As an alterative, the cleaning system can be of a mechanical type.

In this case, the cleaning system can comprise a vibrating device for causing vibration of a structure, particularly a metallic structure, which supports the filtering elements 2. Thus, also the respective filtering surface is caused to vibrate, which causes detachment of dust particles from the filtering surface.

It is also possible to use impact cleaning systems, i.e. cleaning systems provided with an element having a significant mass which is accelerated until it has a momentum such as to cause a collision on the structure supporting the filtering elements 2. The latter are then set into motion, until the respective filtering surface is cleaned.

The collision can also be repeated more than once, in order to improve the cleaning effect, but it significantly differs from the vibrating device which continuously causes vibrations. Furthermore, a system based on a vibrating device transfers the dynamic effect to the structure through its connection with the structure, without impact phenomena.

The cleaning system is of a periodic type, i.e. it does not continuously act on the filtering assembly 1, but it intervenes only at preset moments.

The cleaning system can be of an automatic type, i.e. comprising a cleaning device and a software that, in addition to activating the cleaning device, decides when the cleaning device has to be activated.

Alternatively, the cleaning system can be of a semi-automatic type, i.e. provided with a cleaning device whose intervention is decided by an operator, instead of being managed by a software.

In any case, the cleaning device is configured to act on the filtering assembly 1 in an assembled configuration, i.e. in a configuration in which the cross-sections of the filtering elements 2 and of the flow channels 3 define, as a whole, a cross-section of the filtering assembly conformed as a two-dimensional repetition of closed geometric figures.

In particular, the cleaning system is configured to act on the filtering assembly 1 while the rows of filtering elements 2 are in contact with each other, at least in the direction of the axis Y. In some cases, the cleaning system can be activated after the head 5 and/or the closure bottom 6 have been removed, but it is not required to remove the external casing 7, nor to separate the rows of filtering elements 2.

This makes the cleaning operations of the filtering assembly 1 particularly simple and quick.

As mentioned, the dust collector in question can have one or more filtering assemblies; the method for manufacturing these filtering assemblies, which will be described below, is very simple.

Figure 1:
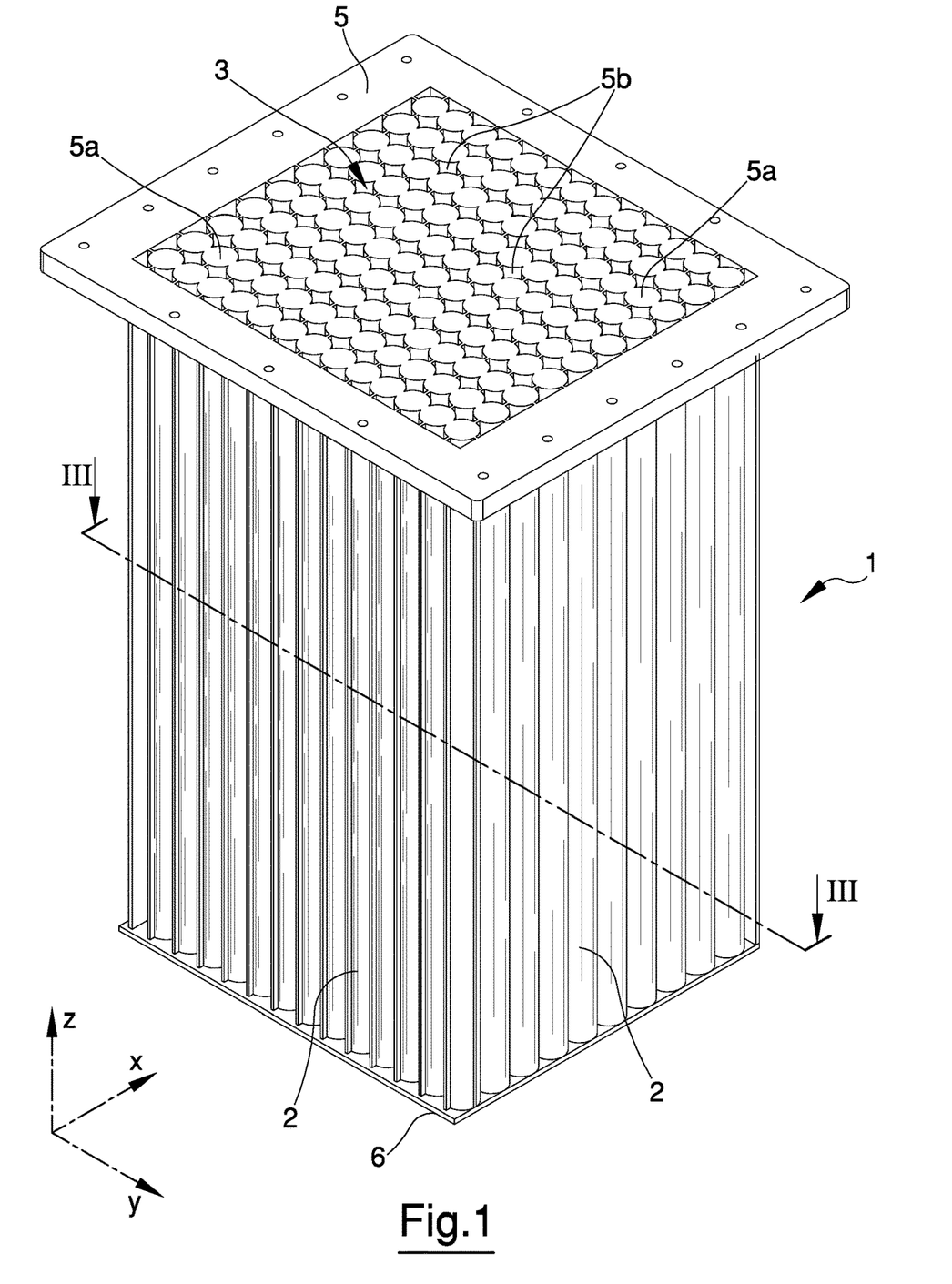
FIG. 1 shows a perspective view from above of a filtering assembly of the dust collector in question without the external casing.
Figure 2:
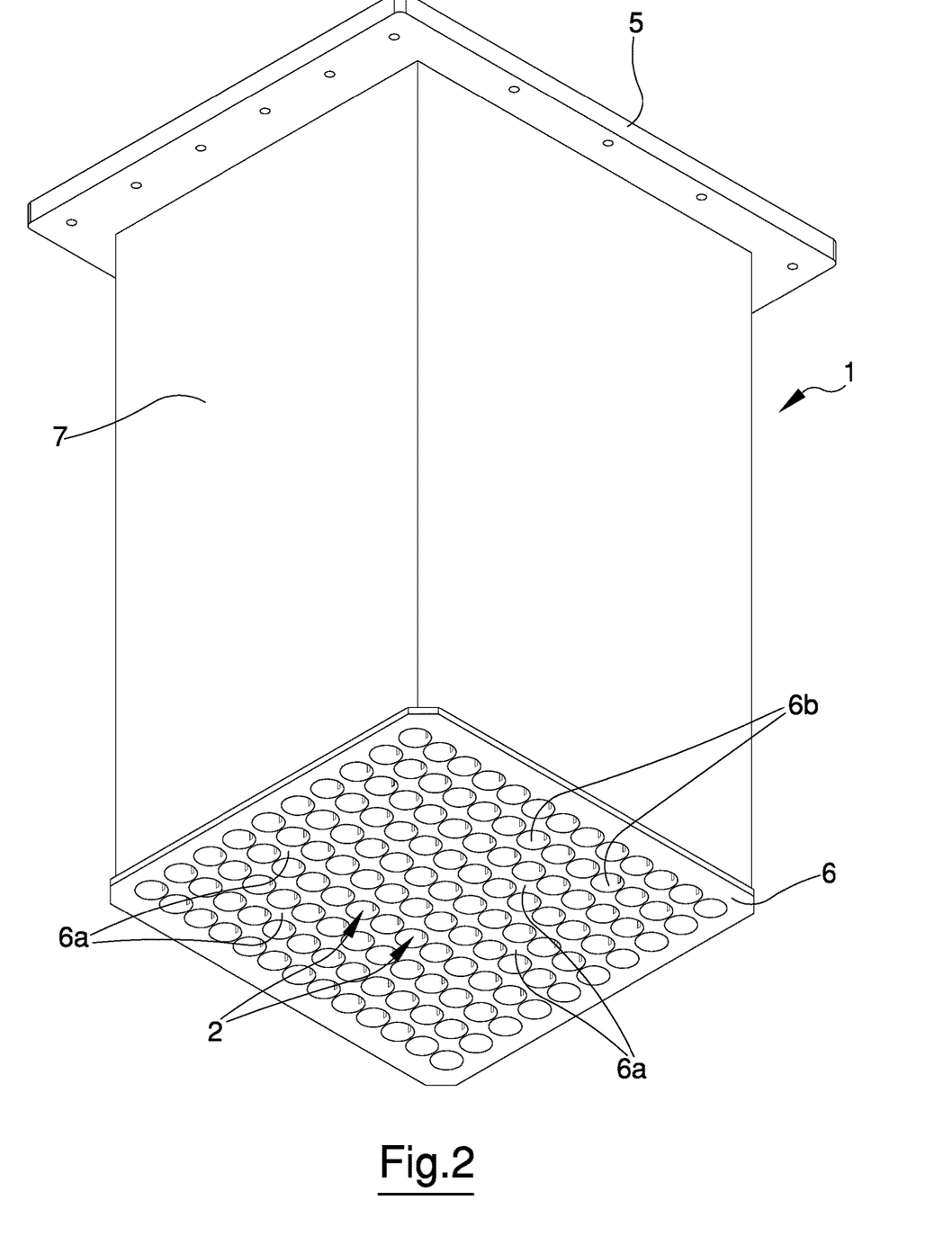
FIG. 2 shows a perspective view from below of a filtering assembly of the dust collector in question.
Figure 3:
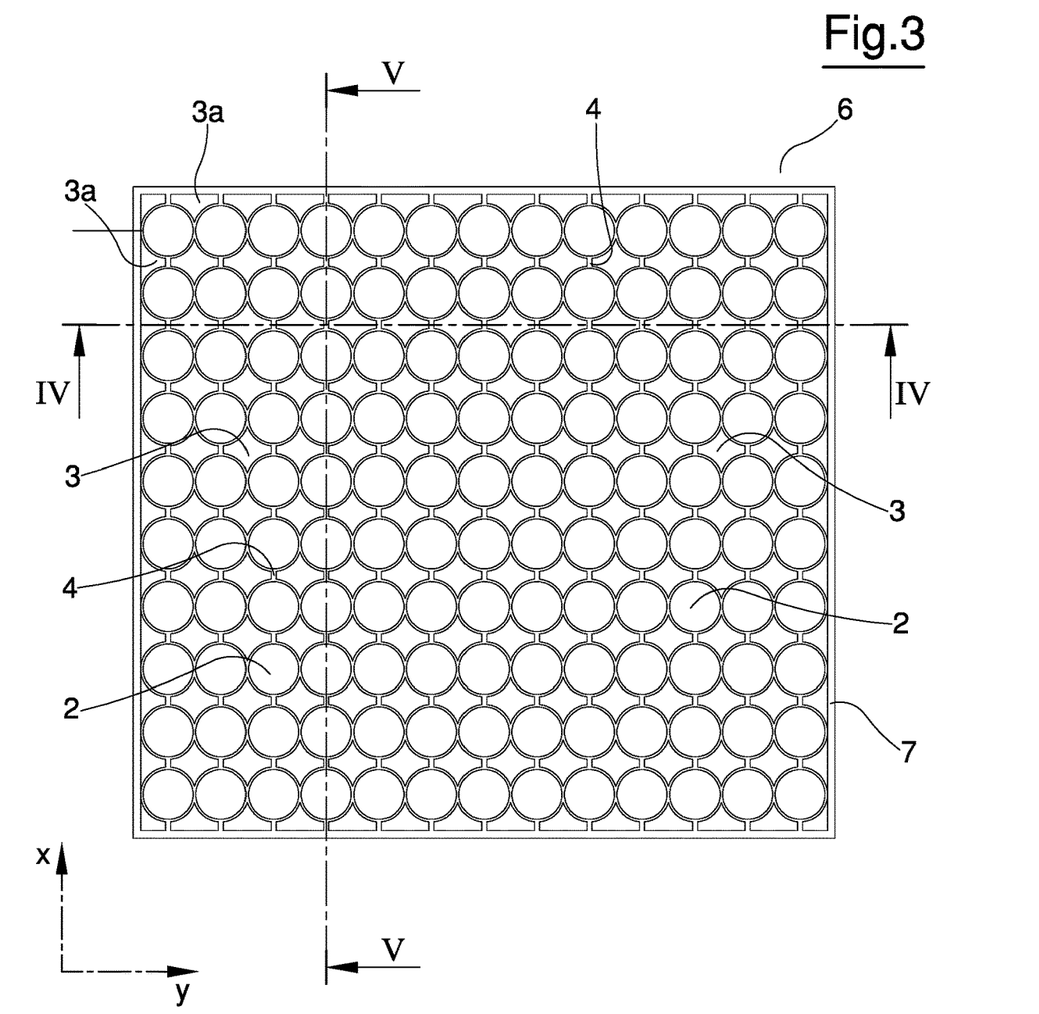
FIG. 3 shows a cross-section of a filtering assembly of the dust collector in question taken along the plane of trace III-III of FIG. 1.
Figure 4:
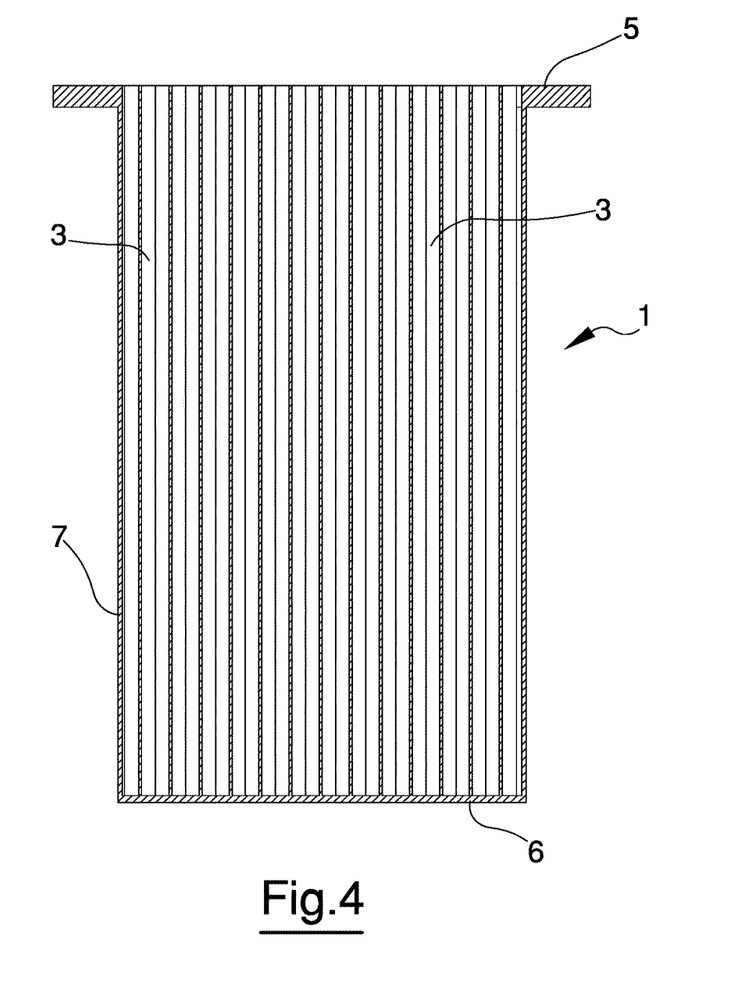
FIG. 4 shows a cross-section of a filtering assembly of the dust collector in question taken along the plane of trace IV-IV of FIG. 3.
Figure 5:
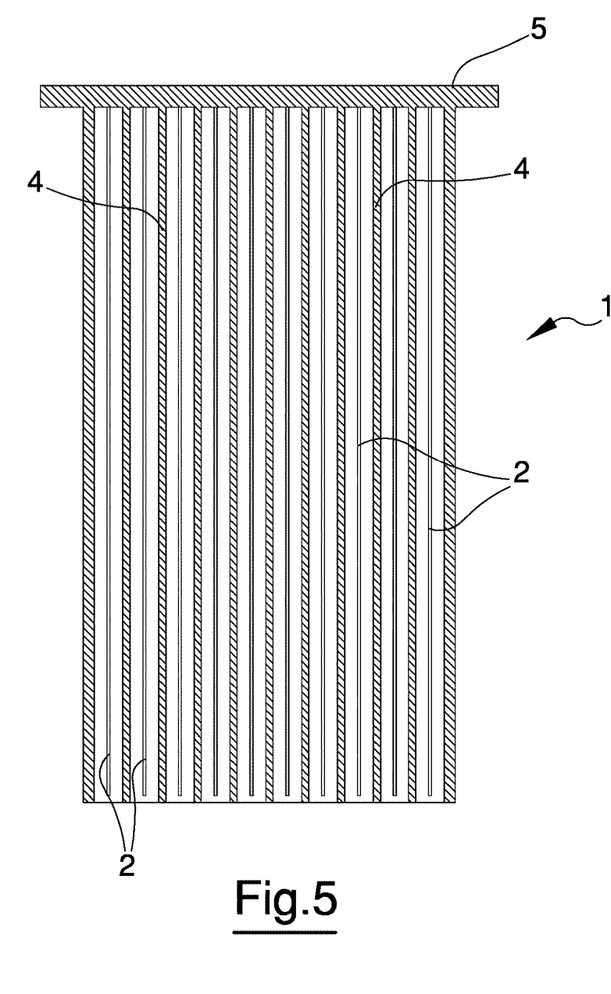
FIG. 5 shows a cross-section of a filtering assembly of the dust collector in question taken along the plane of trace V-V of FIG. 3.
Figure 6:
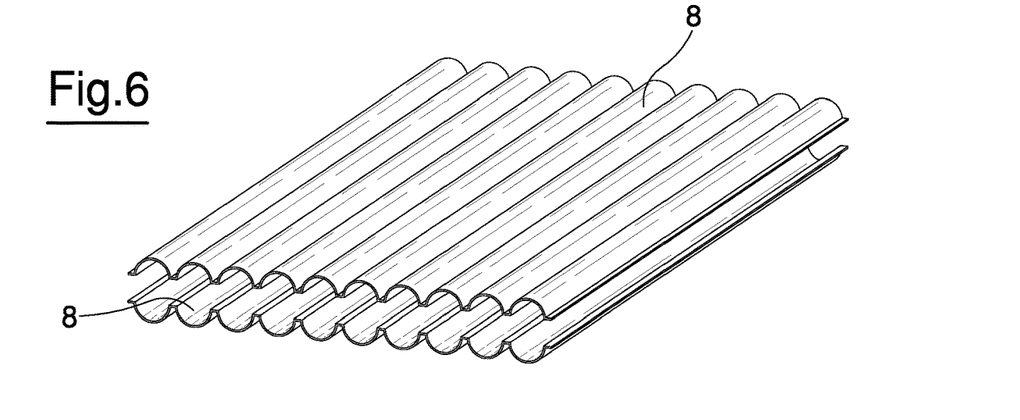
FIG. 6 shows a perspective view of two corrugated sheets with a section defined by repetitions of 'Ω shapes prior to their connection to form a row of filtering elements of the dust collector in question.

A sheet of a semi-rigid filtering material (such as, for example a non-woven fabric or cellulose) is permanently deformed, so as to obtain a corrugated sheet 8 with a cross-section defined by repetitions of 'Ω-shaped forms that are connected to each other; then two sheets deformed in this manner are coupled, with the hollow parts of the 'Ω-shaped forms facing each other, by gluing and welding such sheets so as to join the straight parts of the 'Ω-shaped forms and to obtain rows of filtering elements spaced apart from each other and connected by means of spacer sections 4 formed by the parts that are joined to each other. Theoretically, the presence of the head 5, of the closure bottom 6 and of the casing 7 could make gluing or welding between the corrugated sheets that form the rows of elements not necessary, since the presence of the head 5, of the closure bottom 6 and of the casing 7 keeps the assembly of corrugated sheets compact inside it; this solution may however not provide not fully satisfactory operation, particularly for food products.

To obtain a filtering assembly, the various rows of filtering elements are then connected together, by joining them through gluing or welding on the generatrices of the elements facing each other or by keeping them clamped so as to ensure contact between the elements of the various rows. Then the ends of the filtering elements and of the flow channels are closed, for example with a head and a closure bottom such as those described above.

In this filtering assembly the gaseous fluid from which dust has to be removed is made to enter from the open ends of the filtering elements 2; the fluid without dust exits from the filtering fabric which withholds the solid particles, and is ejected from the filtering assembly through the flow channels 3. Periodically, with programmed automatic or semi-automatic cleaning systems, the particles withheld by the filtering elements are removed in order to free the filtering surfaces and allow correct dust removal from the fluid.

The filtering assembly in question has a high filtering surface area value per unit of volume; it therefore allows notable advantages to be obtained in terms of dimensions and costs. Furthermore, the rigidity of the structure of the assembly allows easy and quick cleaning operations.

The structure of the filtering elements allows the polluted fluid to flow into the elements without meeting vertices or bottlenecks, therefore without the danger of agglomerates forming that obstruct the passage of the fluid and reduce the effective filtering surface area. Furthermore, the presence of spacer sections 4 allows the section of the flow channels to be increased so as to prevent undesired backpressures for the fluid without dust at the outlet from the filtering elements.

The invention claimed is:

1. A dust collector for removing dust from gaseous fluids containing fine dusts that originate from industrial processes, comprising:
one or more filtering assemblies, each of which has a plurality of filtering elements extending in a tubular form, having a length and closed at one end, wherein:
the filtering elements are made of a rigid or semi-rigid filtering material;
at least some of the filtering elements are connected to each other with interposition of spacer sections, wherein the spacer sections are arranged on generatrices of the filtering elements so that parallel rows of filtering elements connected by spacer sections are formed, the rows extending parallelly to a first axis of a system of cartesian axes;

the rows of the filtering elements of the same filtering assembly are kept in contact with each other along a direction parallel to the length of the filtering elements, the spacer sections extending along the entire length of the filtering elements that the spacer sections connect, so that laterally closed flow channels for the gaseous fluid extend longitudinally and are enclosed between the filtering elements and the spacer sections;

the cross-sections of the filtering elements and flow channels define, as a whole, a cross-section of the respective filtering assembly as a two-dimensional repetition of closed geometric figures;

the flow channels are open at one end and closed at a further end opposite the end at which the filtering elements are closed, and the dust collector further comprising a cleaning system for periodic automatic or semi-automatic cleaning of said one or more filtering assemblies.

2. A dust collector according to claim 1, wherein said rows of filtering elements are placed side by side in a direction perpendicular to the first axis, so that each filtering element is in contact, along a generatrix thereof, with a generatrix of an adjacent filtering element.

3. A dust collector according to claim 1, wherein the filtering elements have a curvilinear cross-section; the rows of filtering elements are kept in contact with each other so that along a generatrix, each filtering element is in contact with the generatrix of a filtering element in the adjacent row.

4. A dust collector according to claim 1, wherein each filtering assembly comprises:

a head that is arranged at one end of the filtering assembly and that comprises closure caps for the closed ends of the filtering elements, the head having openings for the open ends of the flow channels;

a closure bottom that is arranged at the other end of the filtering assembly and that comprises closure caps for the closed ends of the flow channels, the closure bottom having openings for the open ends of the filtering elements.

5. A dust collector according to claim 4, wherein the closure bottom is delimited by a profile tangent to the filtering elements on the first axis and sufficient to house a spacer section on a second axis so as to prevent dust from depositing, said second axis being perpendicular to said first axis.

6. A dust collector according to claim 4, wherein each filtering assembly comprises an external casing that extends between the head and the closure bottom and that encloses all the filtering elements of the filtering assembly, and wherein further flow channels for the gaseous fluid are defined between the filtering elements and an internal surface of the external casing.

7. A dust collector according to claim 1, wherein: the cross-section of the filtering elements is circular and each filtering element has a cross-section with a diameter comprised between 5 and 30 millimetres; the ratio between the length of a filtering element and its diameter ranges between 15 and 100.

8. A dust collector according to claim 1, wherein the length of the spacer sections is greater than zero and less than, or equal to, once the diameter of the filtering elements.

9. A dust collector according to claim 1, wherein the length of the filtering elements is less than 1500 millimetres.

10. A dust collector according to claim 1, wherein the filtering elements are made by coupling sheets of non-woven fabric or cellulose that are permanently deformed so that their cross-section is defined by repetitions of 'Ω-shaped forms that are connected to each other.

11. A dust collector according to claim 4, wherein said head and closure bottom are made of an elastomeric or plastic polymer material.

12. A method for manufacturing a filtering assembly of a dust collector according to claim 1, comprising the following steps:

permanently deforming a sheet of a rigid or semi-rigid filtering material so as to obtain a corrugated sheet with a cross-section defined by repetitions of 'Ω-shaped forms that are connected to each other;

with hollow parts of the 'Ω-shaped forms facing each other, coupling two sheets so deformed, so as to keep straight parts of the 'Ω-shaped forms in contact and to obtain rows of filtering elements spaced apart from each other and connected by spacer sections formed by the parts that are kept in contact with each other, the spacer sections extending along the entire length of the filtering elements that the spacer sections connect, so that laterally closed flow channels for the gaseous fluid extend longitudinally and are enclosed between the filtering elements and the spacer sections;

connecting the rows of filtering elements to each other, by placing them in contact along generatrices of the elements facing each other, the spacer sections being arranged on generatrices of the filtering elements so that parallel rows of filtering elements connected by spacer sections are formed, the rows extending parallelly to a first axis of a system of cartesian axes;

closing the ends of the filtering elements and of the flow channels that are formed between the filtering elements, wherein the cross-sections of the filtering elements and flow channels define, as a whole, a cross-section of the filtering assembly as a two-dimensional repetition of closed geometric figures.

13. A method according to claim 12, wherein contact between the straight parts of the 'Ω-shaped forms and the rows of filtering elements is obtained by gluing or welding.

14. A method according to claim 12, wherein contact between the straight parts of the 'Ω-shaped forms and the rows of filtering elements is obtained by a mechanical constraint.

15. A method according to claim 14, wherein contact between the straight parts of the 'Ω-shaped forms and the rows of filtering elements is obtained by insertion of closure caps at one end of the filtering elements and at the opposite end of the flow channels, the mutual positions of said closure caps being fixed and predetermined according to the dimensions of the cross-sections of the filtering elements and flow channels.

\* \* \* \* \*